United States Patent
Larson et al.

[11] Patent Number: 6,050,344
[45] Date of Patent: Apr. 18, 2000

[54] ROTARY GARDEN TOOL

[76] Inventors: David Arthur Larson, R.R. 1 Box 18E, Pine City, Minn. 55063; Roger James Morrell, 10641 Washburn Ave. S., Bloomington, Minn. 55431

[21] Appl. No.: 09/306,118

[22] Filed: May 6, 1999

Related U.S. Application Data

[60] Provisional application No. 60/086,717, May 26, 1998.

[51] Int. Cl.$^7$ .................................... A01B 1/16
[52] U.S. Cl. .............................. 172/378; 172/25
[58] Field of Search .................. 172/25, 111, 372, 172/373, 378, 371; 175/394, 335, 385, 386, 387; 294/50.6, 50.8

[56] References Cited

U.S. PATENT DOCUMENTS

| | | | |
|---|---|---|---|
| 542,584 | 7/1895 | Carter | 172/25 |
| 1,128,051 | 2/1915 | Rose | 172/25 |
| 2,082,476 | 6/1937 | Allen | 172/25 |
| 2,855,668 | 10/1958 | Ottenad et al. | 172/25 |
| 3,129,771 | 4/1964 | Lidstone . | |
| 4,456,075 | 6/1984 | Hostetter | 172/25 |
| 4,618,003 | 10/1986 | Hostetter . | |
| 4,641,712 | 2/1987 | Cravotta | 172/25 |
| 4,723,802 | 2/1988 | Frambrough . | |
| 5,060,997 | 10/1991 | Plecki | 172/25 |
| 5,133,269 | 7/1992 | Charneski | 172/25 X |

*Primary Examiner*—Robert E. Pezzuto

[57] ABSTRACT

A rotary garden tool has cutting blades for generally horizontal cutting generally disposed in a closed loop configuration sharpened on both sides to cut while rotating in either a clockwise of counterclockwise direction. Flexible tines are designed to bend outwardly away from the cutting blades during rotation, thus creating a trapping space between the blades and tines. The tool also has a forked assembly generally central of the cutting blades and flexible tines to stabilize the tool while in use and can till the soil as well. There is also provided a shaft central of the blades, tines, and forked assembly to attach the remainder of the tool to a rotation system such as a hand crank or electric drill.

3 Claims, 3 Drawing Sheets

ROTARY GARDEN TOOL

CROSS REFERENCES TO RELATED APPLICATION

This application claims the benefit of U.S. Provisional Patent Application Ser. No. 60/086,717 titled Spin Weeder-Tiller filed May 26, 1998.

BACKGROUND OF THE INVENTION

1. Field of Invention

This invention relates generally to the field of gardening and more particularly to a machine for removing weeds from lawns and gardens and for light tilling of the soil.

2. Background and Prior Art

Previous devices that use a rotary or spinning motion for weeding and tilling are found in U.S. Pat. Nos. 3,129,771, 4,618,003, 4,641,712, and 4,723,802. These devices have several deficiencies that limit their effectiveness. None of the prior art has a blade configuration that can cut in either direction for even wear or for the convenience of the operator. Neither are they able to cut in a fashion that surrounds a weed. None has the ability to pinch and hold the weed for winding or for cutting and for carrying to a disposal area. All of the prior art cannot effectively grab onto the tap root of some large weeds to allow it to be wound and pulled from the ground. The smooth center point of some prior devices must be pushed into the ground and thus would be difficult to use in hard soil.

The present invention has none of these deficiencies. It has cutting blades sharpened on both sides so that can cut easily in either direction and the sharpened blades are effective in both cutting off weeds and for tilling the soil. The forked center point is very effective for grabbing the tap roots of large weeds that allows the entire tap root to be wound and pulled from the ground. The forked center point also cuts into the soil and thus can be inserted into soils of any hardness. The present invention has flexible tines that form a weed trap that pinch's and holds the weed onto the device. This allows the weed to be securely held for either cutting or winding the weed and allows it to be carried to a discard area.

SUMMARY OF THE INVENTION

The present device is a tool that uses a rotary motion supplied by a separate electric motor, such as an electric drill, or a manual crank handle or brace. The operator simply places the rotating tool onto the weed and as it rotates the weed, it cuts and/or winds and pulls the weed from the ground. The tool can be used to shallow till the soil by simply rotating the tool in the desired area. The device is fast, effective, and requires very little effort to operate.

The lower end of the device has a cutter head that has double edged cutting blades formed into a symmetrical closed loop, generally circular or rectangular shaped, that can cut in either the clockwise or counter clockwise direction. The cutting blades make generally horizontal cuts as the device is rotated which then can cut off weeds, wind up weeds, or till the soil. Flexible tines bend outwardly slightly during use to form a weed trap that can pinch and hold the weed for cutting, winding, or discard. A forked center point stabilizes the cutter head, and attaches to and holds the weed for winding and removal. Finally, the upper end of the device is designed to be attached to a separate rotation system which can either be a motor, such as an electric drill, or a manual crank handle.

It is therefore the object of the present invention to provide an improved device that both removes weeds and tills the soil.

Another object of the invention is a device that works in both lawns and gardens.

Another object of the invention is a device that works on many types of weed.

A further object of the invention is a device that can be operated by either a separate motor, such as an electric drill, or by a manual crank handle.

In accordance with a preferred embodiment of the present invention, a rotary garden tool comprises cutting blades for generally horizontal cutting, the cutting blades being generally disposed in a closed loop configuration adapted to cut while rotating in either a clockwise of counterclockwise direction; flexible tines designed to bend outwardly away from the cutting blades while rotated creating a trapping space therebetween; a forked assembly generally central of the cutting blades and flexible tines; and a means far attaching the blades, flexible tines and forked assembly to a rotation system.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
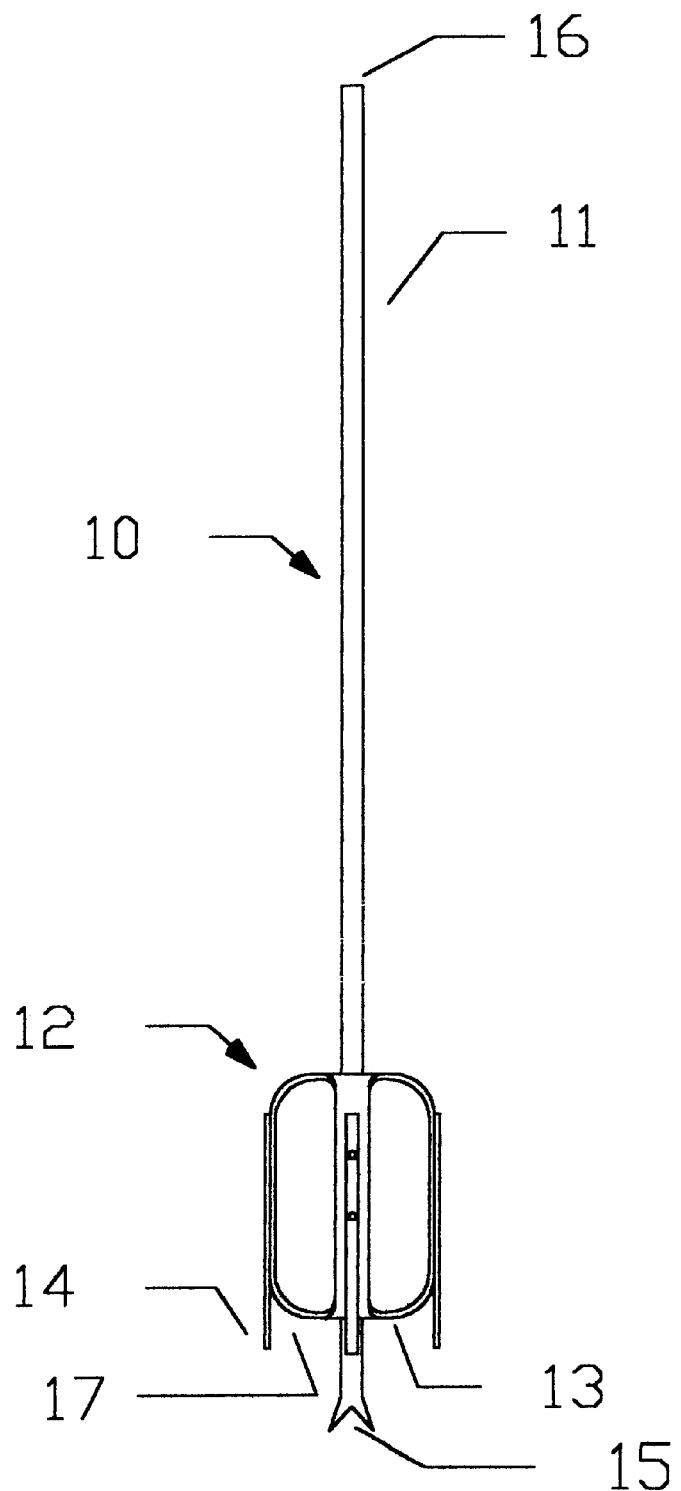
FIG. 1 is a cross-sectional side view of a rotary garden tool in accordance with a preferred embodiment of the present invention.
Figure 2:
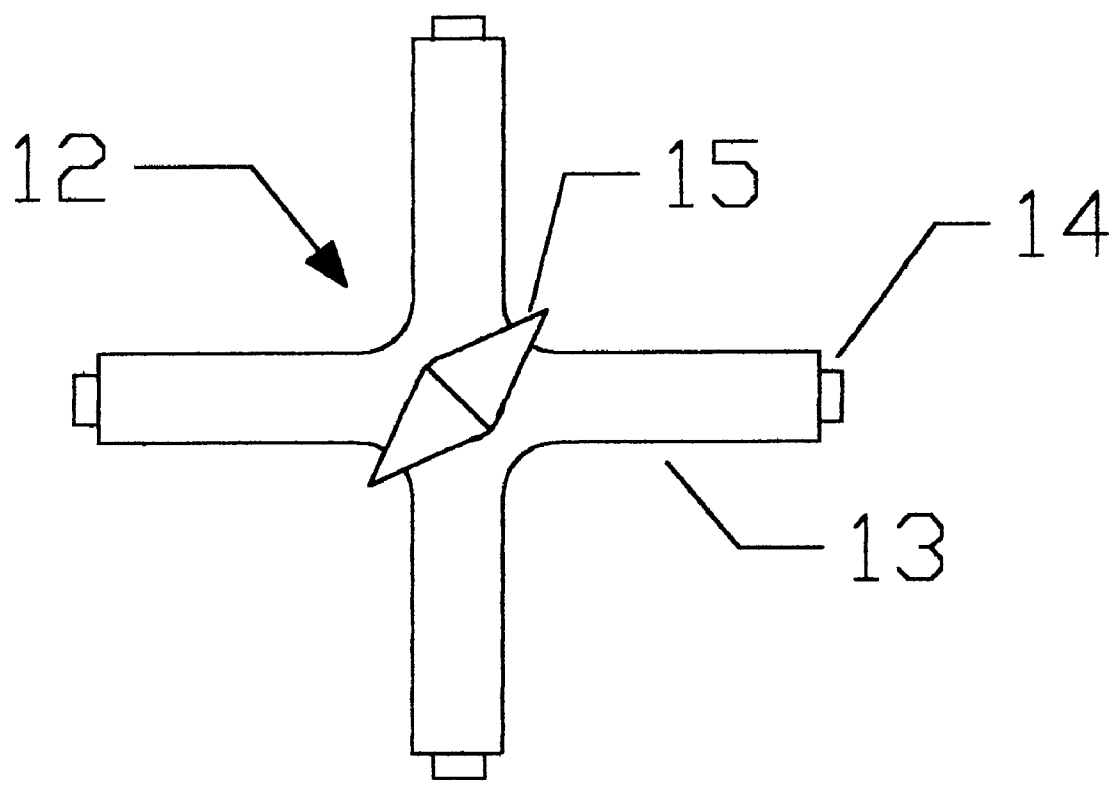
FIG. 2 is a bottom plan view of the rotary garden tool of FIG. 1.

Referring to the drawings in detail as shown in FIGS. 1 and 2, numeral 10 represents the device according to a preferred embodiment of the present invention. In FIG. 1 device 10 is constructed with steel shaft or rod 11, generally central of tool 10. The lower end of shaft 11 has cutter head 12 with cutting blades 13, tines 14, and forked center assembly 15. The upper end 16 of shaft 11 is attached to the separate rotation system by means of a chuck, bolts, pins, etc. Shaft 11 is generally made of steel, with a square or circular or cross section, and is generally 2 to 4 ft in length.

The cutting blades are flat cutting blades with two sharpened edges that are formed into the shape of a symmetrical closed loop. This closed loop may be in the form of a circle, a rectangle, or a combination of the two. The number of cutting blades 13 can be of any number but is in the preferred embodiments 2, 3 or 4. The blades are double edged for cutting or tilling in either the clockwise or counterclockwise rotation direction. Tines 14 are flexible strips or wires made of steel with sharpened tips. The upper ends of the tines are attached to the sides of the cutting blades by rivits, welding, etc and the lower ends are free to flex outwardly during use to form a weed trap. Any number of tines can be used and their location along the blades is a variable. Forked center assembly 15 is at the lower end of the shaft and is used to cut, stabilize, and attach to weeds. It is generally 1 to 3 inches in length and made of steel or other hard material. The overall size of cutter head 12 is a variable but is usually between 1 and 4 inches in diameter and is symmetrical in shape.

Figure 3:
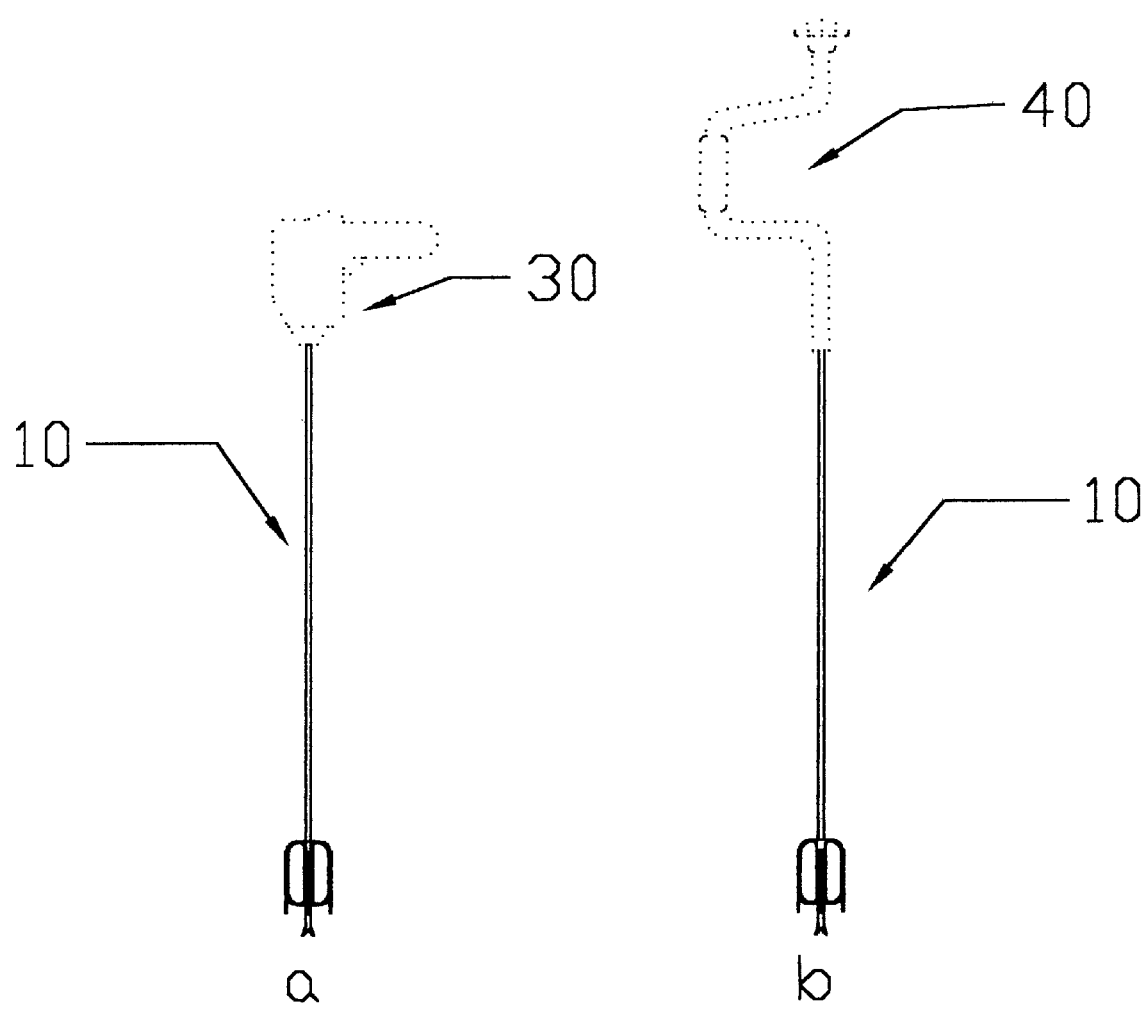
FIGS. 3a & 3b are cross-sectional side views showing a rotary garden tool in accordance with a preferred embodiment of the present invention attached to an electric drill and a manual crank handle rotation system.

In FIG. 3*a* electric drill 30 is shown as the source of power for the rotation of device 10. In FIG. 3*b* manual crank handle 40 is shown as the rotation source for device 10. It is understood that other power or manual devices can be used as the rotation system for the same result. If an electric drill is used as the rotation system, the shaft is attached to the drill by means of the drill chuck. If the manual crank handle is the rotation system, the shaft end 16 can be attached to the handle by various means including pins, bolts, threads, or welding.

In operation as a weeder, cutter head 12 is placed in contact with the weed. As the cutter head rotates it begins to dig up the weed and also to wind it around the cutter head. This winding action serves to pull the weed from the ground. Flexible tines 14 expand slightly during the cutting operation to form weed trap 16 between the cutting blades and the tines. This pinches the weed and holds it as it is wound onto the cutter head. For small weeds, the weeding action may be mostly a cutting action while for larger weeds it may be mostly a winding and pulling action. Generally it is a combination of both the cutting and pulling actions. Weeds that are wrapped around the cutter head are simply shaken off or are scraped off with the foot or hand.

The tilling action is a similar motion as the weeding action. As cutter head 12 is rotated it moves down into the soil in a generally vertical direction and the cutting blades make generally horizontal slices though the soil to both till and aerate the soil. Tilling like weeding can be done by rotating the cutter head in either direction.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for removing weeds from lawns and gardens and also capable of light tilling of the soil, the apparatus comprising:

an elongated, rotatable shaft with a cutter head at one end of the shaft, the cutter head having substantially flat cutting blades attached thereto wherein the cutting blades are formed into a plurality of symmetrical closed loop shapes, the cutter head further having flexible tines extending downwardly therefrom and a forked center point; the flexible tines capable of bending slightly to form a weed trap and to automatically pinch and hold weeds during rotation of the apparatus;

the cutting blades having opposed double edges whereby in operational use of the apparatus the cutting blades are capable of cutting in either a clockwise or counter clockwise direction;

the forked center point having cutting edges and acting to guide and stabilize the apparatus as the apparatus advances into the soil to remove weeds or till the soil.

2. The apparatus of claim 1 wherein a rotation force applying means is by an electric hand drill.

3. The apparatus of claim 1 wherein a rotation force applying means is by a manually operated crank handle or brace.

\* \* \* \* \*